United States Patent

[11] 3,543,921

[72] Inventor Terrag W. Bradley
Los Gatos, California
[21] Appl. No. 813,025
[22] Filed April 3, 1969
[45] Patented Dec. 1, 1970
[73] Assignee International Business Machines Corporation
Armonk, New York
a corporation of New York

[54] CONTAINER WITH EXTERNAL SHOCK ABSORBING STRUCTURE
13 Claims, 3 Drawing Figs.

[52] U.S. Cl. .......... 206/62, 206/46, 220/69, 220/85, 248/20, 340/174.1
[51] Int. Cl. .......... B65d 25/005, B65d 85/30
[50] Field of Search .......... 206/62(P.R.), 62, 46(Fragile), 52(Film); 220/69, 85(B); 340/174.1; 150/0.5; 215/12; 248/20, 22, 350, 358

[56] References Cited

UNITED STATES PATENTS

| | | | |
|---|---|---|---|
| 1,452,035 | 4/1923 | Freeman | 248/350 |
| 2,847,144 | 8/1958 | Cornelius | 220/69 |
| 3,040,899 | 6/1962 | Kron | 248/22 |
| 3,158,296 | 11/1964 | Cornelius | 220/85(B)UX |
| 3,176,281 | 3/1965 | Pattison | 206/62(P.R.UX) |
| 3,206,214 | 9/1965 | Leary | 206/62(P.R.UX) |
| 3,219,082 | 11/1965 | Doerpinghaus | 150/0.5 |
| 3,349,940 | 10/1967 | Cornelius | 220/69(UX) |
| 3,372,826 | 3/1968 | Heaton | 215/12 |

*Primary Examiner*—William T. Dixson, Jr.
*Attorney*— Hanifin and Jancin and John H. Holcombe

ABSTRACT: A container with a resilient, annular protrusion at the base of the container which extends both downwardly and outwardly from a circular center portion. An object, such as a disk pack, is mounted on the center portion. The annular protrusion is attached to the center portion by a flexure and includes an annular bearing portion for bearing approximately radially inward against the hub of the disk pack. Impact energy from either the bottom or side of the container causes the flexure to give, allowing the bearing portion to contact the hub, causing a compression and resultant deformation of the protrusion therebetween, the deformation absorbing at least a portion of the impact energy.

INVENTOR
TERRAG W. BRADLEY

BY John H. Holcombe
ATTORNEY

CONTAINER WITH EXTERNAL SHOCK ABSORBING STRUCTURE

BACKGROUND OF THE INVENTION

1. Field of the Invention

The invention relates to containers, and more particularly to protective containers for delicate objects, such as disk packs.

2. Description of the Prior Art

A delicate, portable object which is often moved about during its useful life is a disk pack for magnetic disk files. Magnetic disk files comprise a device for storing data for computing systems. The physical medium on which the data is stored is the disk pack. This data is written on and read from the disk pack by magnetic heads which are attached to and positioned by the file. The data comprises a plurality of closely spaced, circular tracks on each disk. Each track is read or written by positioning a magnetic head precisely in juxtaposition with the track while the disk pack is rotated about a central axis. In most files, this precise positioning is derived from accurate dimensional relationship between the disk, the pack hub upon which the disk is mounted, the spindle upon which the hub is mounted, the mounting of the spindle for rotation within the file, and the arm mounting the magnetic head within the frame of the file.

A disk pack normally comprises a plurality of disks and spacers, all held together in a unit, usually by means of bolts and a central hub. This unit is subject to misalinement if it receives a substantial sideward shock, the misalinement thereby rendering the disk pack useless since the magnetic head will no longer be alined with the associated track.

The disks of the pack are mounted on the hub so as to comprise a cantilever structure, the disks being relatively thin and extending, unsupported, a significant distance radially outward from the hub. The horizontal flatness of the disks is very important since the magnetic head is normally positioned closely adjacent the disk, spaced therefrom by an air bearing formed therebetween. The head must be completely withdrawn out of the disk pack to allow the pack to be removed from the file, and in most cases is to be moved from track to track on the disk. Hence, any disk droop must be held to a close horizontal tolerance to allow the necessary motion of the head.

The disks, being supported as cantilevers, are subject to substantial downward bending, or drooping, if the disk pack is dropped from as little a height as 2 inches. This bending also renders the pack useless since the heads cannot be inserted into or work properly with the disk pack.

Major advantages of disk packs as a storage medium is the ability to interchange a plurality of disk packs with a single file, or a single disk pack with a plurality of files. In practice, a disk pack is employed on a given file for only a relatively short period of time, less than an hour, and then moved into a storage area or to another magnetic disk file. The disk packs are designed so that they may only be removed from the disk files in a container. At present, containers for disk packs are designed to hold the disk pack rigidly against the bottom of the container and to completely enclose the disk pack to prevent the entry of foreign matter.

However, the disk pack in the container is often subject to being dropped or banged, and the container offers no shock protection to the pack. The frequency of occurrence of such dropping or banging is sufficient to cause a detrimental and costly effect upon the usage of data processing systems.

In recent years, the only improvements to containers for disk packs has been in the area of making the containers less breakable and more resistant to heat.

SUMMARY

An object of the present invention is to provide a container for disk packs to protect against shock by impact from either dropping or banging.

Briefly, the invention comprises an improvement to a container for delicate objects comprising a central portion for mounting thereon the contents of the container. A resilient, annular protrusion is attached to the central portion by a flexure and includes an annular bearing portion adjacent the flexure for bearing approximately radially inward against a central surface fixedly associated with the central portion. Impact energy from either the bottom or side of the container causes the flexure to give, allowing the bearing portion to contact the central surface to cause deformation of the protrusion between the source of impact energy and the central surface, the deformation absorbing at least a portion of the impact energy.

DESCRIPTION OF THE PREFERRED EMBODIMENT

Figure 1:
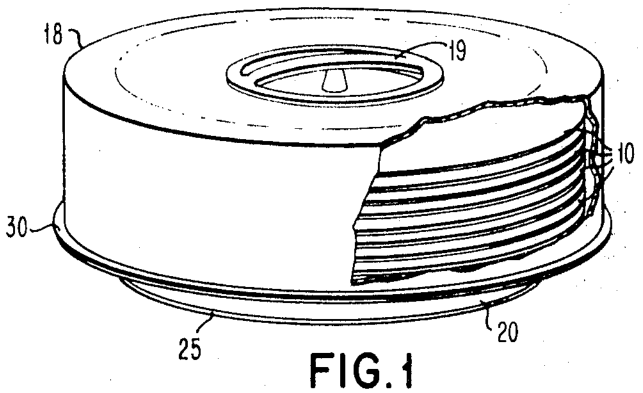
FIG. 1 is a perspective view of a container embodying the present invention.
Figure 2:
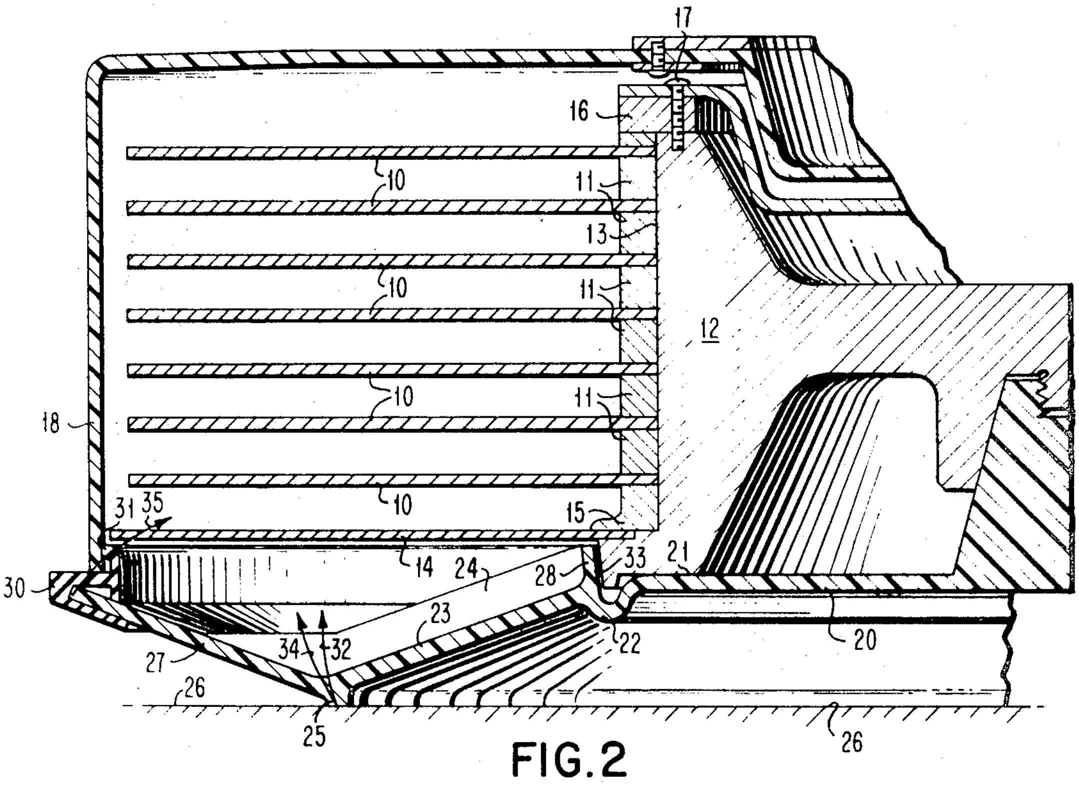
FIG. 2 is a cutaway, cross-sectional illustration of a portion of the container of FIG. 1.

Referring to FIGS. 1 and 2, a disk pack is illustrated in tandem within a container employing the present invention. A plurality of disks 10 are mounted in an assembly including ringlike spacers 11 which maintain the disks spaced apart by a precise, predetermined distance. The disks and spacers are assembled together about a central support casting 12, called a hub, which is provided with a cylindrical outer surface 13. The bottom protective disk 14 is positioned at the bottom of the disk pack, and the disks 10 and the spacers 11 are stacked upon the hub. The disks and spacers are locked firmly in place on the cylindrical section between an annular stop 15 formed at the lower edge of the cylindrical section and a retaining cap 16 secured by a plurality of screws 17 to the upper edge of the hub.

The container for the disk pack includes a top dust cover 18 with a centrally located handle 19, and a bottom cover 20.

An example of a disk pack together with means, including handle 19, for securing the disk pack to a disk file and means for securing a disk pack within the top dust cover 18 to a bottom cover 20 are described in detail in U.S. Pat. No. 3,176,281, R. E. Pattison, "Portable Memory for Data Processing Machine." issued Mar. 30, 1965 and in U.S. Pat. No. 3,206,214, E. G. Leary, "Transporting and Protecting Cases for Drum and Disk Records," issued Sept. 14, 1965.

Figure 3:
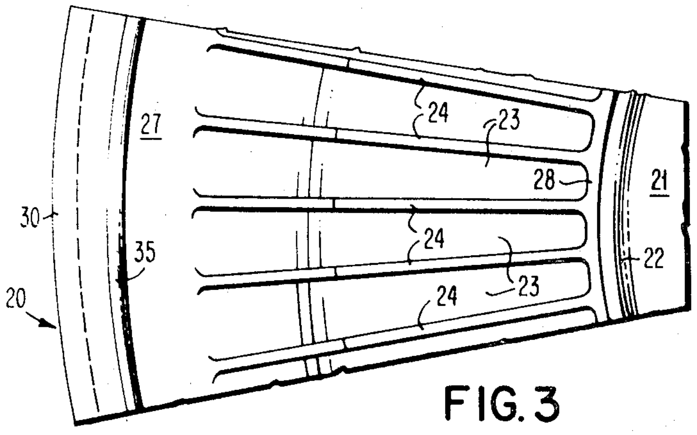
FIG. 3 is a top view of a portion of the bottom of the container of FIG. 1.

Referring to FIGS. 2 and 3, the bottom cover 20 is illustrated which embodies the present invention.

The bottom cover includes a flat portion 21 against which the hub 12 is in firm contact when the disk pack is attached to the bottom cover. Adjacent this central, flat portion 21 is a flexure point 22. From the flexure point, a downwardly extending resilient portion 23 is affixed. The portion 23 extends continuously around the central axis having an outer surface in the form of a truncated conical surface. The interior of the portion 23 has affixed thereto as part of a common casting, a plurality of strengthening ribs 24. Alternatively, the cross-sectional of portion 23 may be made thicker to provide the additional strengthening. Affixed to the portion 23 is a cylindrical foot 25 which extends continuously about the central axis. This cylindrical foot forms the surface upon which the disk pack may be rested on any flat surface 26. Additionally forming part of the bottom cover 20 is an upwardly and outwardly extending portion 27 which, like portion 23, extends continuously about the central axis and forms an outer surface in the shape of a truncated conical surface. The ribs 24 are affixed at one end to the portion 27, along their entire length to portion 23, and at the other end to a bearing portion 28. All the described portions of bottom cover 20 comprise a common casting made of a semiresilient material, such as polycarbonate. Thus, the ribs 24 give added stiffness to portions 23, making the section 23 approximately twice as stiff as portion 27. The primary point of resiliency is flexure point 22.

Placed over the edge of bottom cover 20 is a resilient bumper and seal 30. This bumper is in the form of a ring which fits over the edge of portion 27 of the bottom cover and includes a seal 31 which seals against the top cover 18 to thereby form a dust proof seal between the bottom and top covers. The bumper 30 may be constructed of any soft resilient material, such as rubber.

Designed in this manner, the bottom cover will absorb upward shock energy, for example from dropping the disk pack, by a limited flexing of portion 23 and ribs 24 and by a more extensive flexing of flexure point 22. The cylindrical foot portion 25 will thus move a limited amount in the direction of arrow 32. After a limited deflection, the bearing surface 28 comes into contact with the outer bearing surface 33 of the hub 12. Any additional load at the foot portion 25 results in a compression of portion 23 and ribs 24 between foot portion 25 and bearing surface 33. This compression produces forces by bearing portion 28 upon bearing surface 33 directed slightly upward and radially inward around the entire circumference of the hub 12. Deformation of portion 23 and ribs 24 causes the foot portion 25 to deflect in the direction of arrow 34. Given a deflection constant of approximately 3200 pounds per inch, the total deflection movement of cylindrical portion 25 for a pack weighing approximately 18 pounds after being dropped from a height of 10 inches is 0.3 inches. Thus, the force generated by dropping the disk pack is converted to a compression force about the entire circumference of the hub 12 and the energy absorbed by the deformation of the portions 23 and 24 of the bottom cover 20. Only a limited force will be transmitted vertically to the disks 10, and this force will be insufficient to cause bending or drooping of the disk.

If the disk pack is banged, for example, against the side of a cabinet, the shock load is transmitted by bumper ring 30 to the upwardly and outwardly extending portion 27 of the bottom cover 20. The force initially causes the collapse of flexure 22 on that side of hub 12, bringing bearing portion 28 into contact with bearing surface 33 of hub 12. Any additional load at bumper ring 30 results in a compression of portion 37, portion 23 and ribs 24 between bumper ring 30 and bearing surface 23. These portions of the bottom cover absorb the force by deforming at various rates therealong. The reason for the nonlinear deformation is due to both the presence of ribs 24, each having a nonuniform cross section along the portions 27 and 23 as well as the conically shaped surfaces thereof. The resultant deflection movement of the outer edge of the bottom cover occurs in the direction of arrow 35. This deflection, due partly to the lower stiffness of the portion 27, absorbs a major portion of the force from the shock, and only a small portion of the force is transmitted thereby to the hub 12 of the disk pack. Assuming a deflection constant of 1200 pounds per inch, an 18 pound disk pack banged with a sideways force equivalent to that of dropping the pack from a height of 7 inches results in a deflection by the outer edge of the bottom cover of 0.4 inches. This force can be absorbed without causing misalignment of the disk with respect to the hub 12.

Many alternative implementations of the disclosed resilient, annular protrusion 22, 23, 24, 25, 27 and 28 may be made. For example, the downwardly and outwardly extending portion 23 may be extended to a point beyond the top cover 18, thereby providing protection against impact energy from either the bottom or side of the container. This would convert the direction of deflection by the outer end thereof due to an impact at the side to a direction extending downward and inward rather than the upward and inward direction 35 illustrated with respect to the preferred embodiment.

While the invention has been particularly shown and described with reference to a preferred embodiment thereof, it will be understood by those skilled in the art that the foregoing and other changes in form and details may be made therein without departing from the spirit and scope of the invention.

I claim:

1. In a disk pack container, an energy absorbing bottom cover to protect the contained disk pack from shock comprising:

a central portion having a top surface disposed subjacent the bottom surface of the hub of the associated disk pack;

a downwardly and outwardly extending resilient protrusion attached to said central portion and including a bearing portion disposed above said top surface of said central portion and normally spaced from the side surface of the hub of the associated disk pack; and whereby impact energy applied to said protrusion causes a compression and resultant deformation thereof by absorbing at least a portion of said impact energy, the bearing surface of said bearing portion contacting said side surface of the hub upon deformation of said protrusion, and to transfer a portion of the impact energy thereinto.

2. The energy absorbing means of claim 1, wherein said protrusion comprises an annular protrusion extending downwardly below the bottom surface of the central portion and outwardly beyond the outer perimeter of the walls of the container.

3. The energy absorbing means of claim 1, wherein said resilient, annular protrusion comprises a flexure portion disposed between said central portion and said bearing portion, whereby said impact energy causes flexing of at least a portion of said flexure portion so that said bearing portion contacts said side surface of said hub.

4. The energy absorbing means of claim 3, wherein said resilient annular protrusion includes a downwardly and outwardly extending resilient portion completely encircling a central axis thereof, said central axis being coextensive with the axis of said bearing portion, said axes intersecting the approximate center of gravity of the contained disk pack.

5. The energy absorbing means of claim 3, wherein said resilient protrusion is more stiff than said flexure portion, whereby said resilient protrusion deforms to absorb said impact energy only after said bearing surface contacts said side surface of said hub.

6. A container for a disk pack comprising:

a top cover including a circular top plate and an annular side wall depending downwardly from the outer extremity thereof;

a bottom cover including a central portion having a top surface disposed subjacent the bottom surface of the hub of the associated disk pack;

a flexure member joined to the outer periphery of said bottom cover;

said flexure member having an unflexed position wherein the inner bearing surface thereof remains out of contact with the side surface of the hub of the associated disk pack and a flexed position wherein said inner bearing surface contacts the side surface of the hub of the associated disk pack;

a first resilient annular portion depending downwardly and outwardly from and joined to said flexure member;

a second resilient annular portion extending upwardly and outwardly from and joined to the outer periphery of said first annular portion;

the periphery of said second annular portion having a diameter greater than the outer diameter of said annular side wall of said top cover;

means for connecting said top cover to said bottom cover;

whereby a force applied to the bottom surface of said bottom cover is transmitted through and partially absorbed by, said first annular portion to said flexure member; and whereby a force applied to the periphery of said second annular portion is transmitted radially through, and partially absorbed by, said second annular portion and said first annular portion to said flexure member;

said flexure member changing from said unflexed to said flexed position;

thereby to transmit a portion of the force to the side surface of the hub of the associated disk pack; and thereby to protect the contained disk pack against direct transmission of forces through the outer walls of the container to the contained disk pack.

7. The container set forth in claim 6, wherein said flexure member is annular, resilient and U-shaped.

8. The container set forth in claim 6, wherein said connecting means includes means for sealing said top cover to said bottom cover along the bottom surface of said annular side wall.

9. A bottom cover for cooperating with a top cover of a disk pack container comprising:

a central portion having a top surface disposed subjacent the bottom surface of the hub of the associated disk pack;

a flexure member joined to the outer periphery of said central portion;

said flexure member having an unflexed position wherein the inner bearing surface thereof remains out of contact with the side surface of the hub of the associated disk pack and a flexed position wherein said inner bearing surface contacts the side surface of the hub of the associated disk pack;

a first resilient annular portion depending downwardly and outwardly from and joined to said flexure member;

a second resilient annular portion extending upwardly and outwardly from and joined to the outer periphery of said first annular portion;

the periphery of said second annular portion having a diameter greater than the outer diameter of the cooperating top cover;

whereby a force applied to the bottom surface of said bottom cover is transmitted through, and partially absorbed by, said first annular portion to said flexure member;

whereby a force applied to the periphery of said second annular portion is transmitted radially through, and partially absorbed by, said second annular portion and said first annular portion to said flexure member;

said flexure member changing from said unflexed to said flexed position;

thereby to transmit a portion of the force to the side surface of the hub of the associated disk pack; and thereby to protect the contained disk pack against direct transmission of forces through the outer walls of the container to the contained disk pack.

10. The bottom cover set forth in claim 9, wherein said bottom cover is of unitary construction.

11. The bottom cover set forth in claim 9, and further comprising a plurality of radially extending ribs molded along the top surface of said first and said second annular portions respectively for strengthening said bottom cover.

12. The bottom cover set forth in claim 9, wherein said first annular portion has a conically shaped outer surface and wherein said second annular portion has a conically shaped outer surface.

13. The bottom cover set forth in claim 9, wherein said first annular portion and said second annular portion are more stiff than said flexure member.